United States Patent
Subhojit

(10) Patent No.: US 10,733,978 B2
(45) Date of Patent: Aug. 4, 2020

(54) OPERATING METHOD FOR VOICE FUNCTION AND ELECTRONIC DEVICE SUPPORTING THE SAME

(71) Applicant: SAMSUNG ELECTRONICS CO., LTD., Suwon-si, Gyeonggi-do (KR)

(72) Inventor: Chakladar Subhojit, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 15/998,997

(22) Filed: Aug. 20, 2018

(65) Prior Publication Data
US 2019/0005944 A1    Jan. 3, 2019

Related U.S. Application Data

(63) Continuation of application No. 15/017,957, filed on Feb. 8, 2016, now abandoned.

(30) Foreign Application Priority Data

Feb. 11, 2015    (KR) .................. 10-2015-0020786

(51) Int. Cl.
*G10L 15/07* (2013.01)
*G10L 17/02* (2013.01)
(Continued)

(52) U.S. Cl.
CPC ............ *G10L 15/07* (2013.01); *G10L 15/063* (2013.01); *G10L 15/22* (2013.01); *G10L 17/02* (2013.01);
(Continued)

(58) Field of Classification Search
CPC .................. G10L 15/30; G10L 17/22
(Continued)

(56) References Cited

U.S. PATENT DOCUMENTS 5,170,432 A * 12/1992 Hackbarth ............ G10L 15/07
704/254
5,375,173 A * 12/1994 Sanada .................. G10L 15/07
704/243

(Continued)

FOREIGN PATENT DOCUMENTS

CN    1403953 A    3/2003
CN    1465043 A    12/2003
(Continued)

OTHER PUBLICATIONS

U.S. Appl. No. 15/017,957, filed Feb. 8, 2016; Subhojit.
(Continued)

*Primary Examiner* — Shaun Roberts
(74) *Attorney, Agent, or Firm* — Nixon & Vanderhye P.C.

(57) ABSTRACT

An electronic device is provided. The electronic device includes a memory configured to store at least a portion of a plurality of pieces of speech information used for voice recognition, and a processor operatively connected to the memory, wherein the processor selects speaker speech information from at least a portion of the plurality of pieces of speech information based on mutual similarity, and generates voice recognition information to be registered as personalized voice information based on the speaker speech information.

6 Claims, 11 Drawing Sheets

(51) Int. Cl.
*G10L 15/06* (2013.01)
*G10L 15/22* (2006.01)
*G10L 17/22* (2013.01)
*G10L 15/02* (2006.01)

(52) U.S. Cl.
CPC ........ *G10L 17/22* (2013.01); *G10L 2015/025* (2013.01); *G10L 2015/223* (2013.01)

(58) Field of Classification Search
USPC ...................................... 704/246, 270, 275
See application file for complete search history.

(56) References Cited

U.S. PATENT DOCUMENTS

| | | | |
|---|---|---|---|
| 5,842,165 A * | 11/1998 | Raman | G10L 15/065 704/255 |
| 5,895,447 A * | 4/1999 | Ittycheriah | G10L 15/07 704/231 |
| 6,014,624 A * | 1/2000 | Raman | G10L 15/08 704/243 |
| 6,088,669 A | 7/2000 | Maes | |
| 6,272,463 B1 | 8/2001 | Lapere | |
| 6,374,221 B1 * | 4/2002 | Haimi-Cohen | G10L 15/063 704/256.1 |
| 6,389,393 B1 | 5/2002 | Gong | |
| 6,587,824 B1 * | 7/2003 | Everhart | G10L 15/07 704/243 |
| 6,697,779 B1 | 2/2004 | Bellegarda | |
| 6,873,951 B1 * | 3/2005 | Lin | G10L 15/065 379/88.01 |
| 7,835,913 B2 * | 11/2010 | Aubauer | G10L 15/22 704/270 |
| 8,255,223 B2 | 8/2012 | Wang | |
| 8,275,616 B2 | 9/2012 | Jung et al. | |
| 8,543,834 B1 | 9/2013 | Barra | |
| 8,639,516 B2 | 1/2014 | Lindahl | |
| 8,930,196 B2 | 1/2015 | Jung et al. | |
| 9,070,367 B1 * | 6/2015 | Hoffmeister | G10L 15/187 |
| 9,361,885 B2 | 6/2016 | Ganong | |
| 10,102,359 B2 | 10/2018 | Cheyer | |
| 2002/0143540 A1 | 10/2002 | Malayath et al. | |
| 2002/0152067 A1 | 10/2002 | Viikki et al. | |
| 2003/0033143 A1 | 2/2003 | Aronowitz | |
| 2003/0088414 A1 | 5/2003 | Huang | |
| 2003/0120488 A1 | 6/2003 | Yoshizawa et al. | |
| 2004/0010405 A1 | 1/2004 | Menendez-Pidal et al. | |
| 2004/0059576 A1 | 3/2004 | Lucke | |
| 2006/0111905 A1 * | 5/2006 | Navratil | G10L 15/144 704/256.7 |
| 2006/0122837 A1 * | 6/2006 | Kim | G10L 15/22 704/270.1 |
| 2007/0011010 A1 * | 1/2007 | Dow | G10L 15/30 704/270.1 |
| 2007/0027693 A1 * | 2/2007 | Hanazawa | G10L 15/32 704/275 |
| 2007/0156682 A1 * | 7/2007 | Howell | |
| 2007/0239450 A1 * | 10/2007 | Kienzle | G10L 15/07 704/244 |
| 2008/0215324 A1 | 9/2008 | Hirohata | |
| 2009/0112600 A1 * | 4/2009 | Gilbert | G10L 15/065 704/270.1 |
| 2009/0248412 A1 | 10/2009 | Washio | |
| 2010/0185444 A1 | 7/2010 | Olsen | |
| 2011/0054892 A1 | 3/2011 | Jung et al. | |
| 2011/0054894 A1 * | 3/2011 | Phillips | G10L 15/07 704/235 |
| 2012/0245941 A1 | 9/2012 | Cheyer | |
| 2012/0316879 A1 | 12/2012 | Jung et al. | |
| 2013/0289992 A1 * | 10/2013 | Harada | G10L 15/20 704/249 |
| 2013/0325484 A1 | 12/2013 | Chakladar et al. | |
| 2014/0236598 A1 * | 8/2014 | Fructuoso | G10L 13/04 704/249 |
| 2014/0278435 A1 | 9/2014 | Ganong | |
| 2015/0081295 A1 | 3/2015 | Yun | |
| 2016/0011768 A1 * | 1/2016 | Yim | H04M 1/72519 345/173 |
| 2016/0066113 A1 | 3/2016 | Elkhatib | |

FOREIGN PATENT DOCUMENTS

| | | |
|---|---|---|
| CN | 1666253 A | 9/2005 |
| CN | 1783782 A | 6/2006 |
| CN | 101334997 A | 12/2008 |
| CN | 101547261 A | 9/2009 |
| CN | 103477342 A | 12/2013 |
| EP | 0 856 835 | 8/1998 |
| JP | 06-019497 | 1/1994 |
| JP | 2004-271561 A | 9/2004 |
| KR | 10-2009-0123396 | 12/2009 |
| KR | 10-2013-0133629 | 12/2013 |

OTHER PUBLICATIONS

Chen, Ke, "Personalize Mobile Access by Speaker Authentication." Biometric Solutions, Jan. 1, 2002, pp. 99-129. Retrieved from the Internet: URL:http://www.cs.man.ac.uk/~kechen/pages/publication/chapter5.pdf [retrieved on Jul. 17, 2012].

Search Report and Written Opinion dated May 23, 2016 in counterpart International Patent Application No. PCT/KR2016/001383.

Partial Search Report dated Jul. 4, 2016 in counterpart European Application No. 16155228.6.

EP Examination Report for EP Application No. 16155228.6 dated Aug. 18, 2017.

Extended EP Search Report dated Nov. 9, 2016 for EP Application No. 16155228.6.

Chinese Office Action dated Mar. 11, 2020 for CN Application No. 201680008892.7.

* cited by examiner

OPERATING METHOD FOR VOICE FUNCTION AND ELECTRONIC DEVICE SUPPORTING THE SAME

CROSS-REFERENCE TO RELATED APPLICATION

This application is a Continuation of U.S. application Ser. No. 15/017,957, filed Feb. 8, 2016 (Abandoned), which claims priority to KR 10-2015-0020786, filed Feb. 11, 2015, the entire contents of each of which are hereby incorporated herein by reference.

TECHNICAL FIELD

The present disclosure relates to operation of a voice function in an electronic device.

BACKGROUND

An electronic device which includes a microphone or the like provides a function of collecting and recognizing a user's voice. For example, recent electronic devices provide a function of recognizing a user's voice and outputting information corresponding to a recognized voice.

Meanwhile, according to a typical voice function, only the contents of a collected voice are recognized and a service corresponding thereto is provided. Therefore, a voice function providing method of a typical electronic device may provide a specific function regardless of a person who inputs a voice.

SUMMARY

Accordingly, an aspect of the present disclosure is to provide a voice function operating method for supporting a voice function of an electronic device so that the voice function is operated in a user (i.e., speaker)-dependent manner, and an electronic device supporting the same.

Another aspect of the present disclosure is to provide a voice function operating method for selectively providing a voice function based on the type of an input audio signal, and an electronic device supporting the same.

In accordance with an aspect of the present disclosure, an electronic device is provided. The electronic device may include a memory for storing at least a portion of a plurality of pieces of speech information used for voice recognition, and a control module (or a processor) configured to generate voice recognition information based on at least a portion of the plurality of pieces of speech information, wherein the control module may be configured to select speaker speech information from at least a portion of the plurality of pieces of speech information based on mutual similarity, and may be configured to generate the voice recognition information to be registered as personalized voice information based on the speaker speech information.

In accordance with another aspect of the present disclosure, a voice function operating method is provided. The voice function operating method may include storing at least a portion of a plurality of pieces of speech information used for voice recognition, selecting speaker speech information from at least a portion of the plurality of pieces of speech information based on mutual similarity, and generating voice recognition information to be registered as personalized voice information based on the speaker speech information selected.

BRIEF DESCRIPTION OF THE DRAWINGS

These and other aspects and advantages of the disclosure will become more apparent and readily appreciated from the following detailed description, taken in conjunction with the accompanying drawings, in which like reference numerals refer to like elements, and wherein.

DETAILED DESCRIPTION

Figure 1:
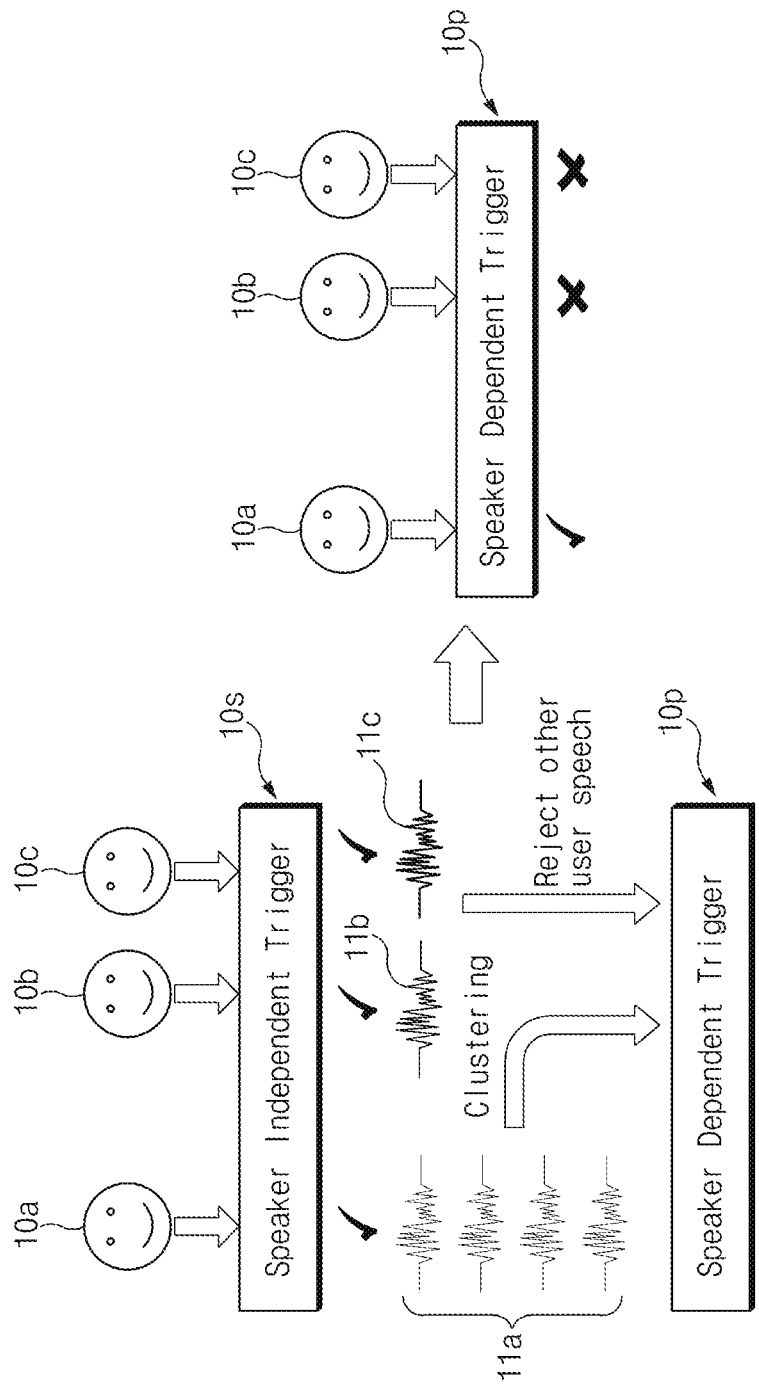
FIG. 1 is a diagram illustrating an example personalized voice function providing environment according to various example embodiments of the present disclosure.

Hereinafter, various example embodiments of the present disclosure will be described in greater detail with reference to the accompanying drawings. However, it should be understood that the present disclosure is not limited to specific example embodiments, but rather includes various modifications, equivalents and/or alternatives of various example embodiments of the present disclosure. Regarding description of the drawings, like reference numerals may refer to like elements.

The term "have", "may have", "include", "may include", "comprise", or the like used herein indicates the existence of a corresponding feature (e.g., a number, a function, an operation, or an element) and does not exclude the existence of an additional feature.

The term "A or B", "at least one of A and/or B", or "one or more of A and/or B" may include all possible combinations of items listed together. For example, the term "A or B", "at least one of A and B", or "at least one of A or B" may indicate all the cases of (1) including at least one A, (2) including at least one B, and (3) including at least one A and at least one B.

The term "first", "second" or the like used herein may modify various elements regardless of the order and/or priority thereof, but does not limit the elements. For example, "a first user device" and "a second user device" may indicate different user devices regardless of the order or priority. For example, without departing the scope of the present disclosure, a first element may be referred to as a second element and vice versa.

It will be understood that when a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element.

The term "configured (or set) to" may be interchangeably used with the term, for example, "suitable for", "having the capacity to", "designed to", "adapted to", "made to", or "capable of". The term "configured (or set) to" may not necessarily have the meaning of "specifically designed to". In some examples, the term "device configured to" may indicate that the device "may perform" together with other devices or components. For example, the term "processor configured (or set) to perform A, B, and C" may represent a dedicated processor (e.g., an embedded processor) for performing a corresponding operation, processing circuitry or a general-purpose processor (e.g., a CPU or an application processor) for executing at least one software program stored in a memory device to perform a corresponding operation.

The terminology used herein is only used for describing example embodiments and is not intended to limit the scope of other embodiments. The terms of a singular form may include plural forms unless otherwise specified. The terms used herein, including technical or scientific terms, have the same meanings as understood by those skilled in the art. Commonly-used terms defined in a dictionary may be interpreted as having meanings that are the same as or similar to contextual meanings defined in the related art, and should not be interpreted in an idealized or overly formal sense unless explicitly defined otherwise. The terms defined herein should not be such interpreted to exclude the various example embodiments of the present disclosure.

Hereinafter, an electronic device according to various example embodiments of the present disclosure will be described with reference to the accompanying drawings. The term "user" used herein may refer to a person who uses an electronic device or may refer to a device (e.g., an artificial electronic device) that uses an electronic device.

FIG. 1 is a diagram illustrating an example personalized voice function providing environment according to various example embodiments of the present disclosure.

Referring to FIG. 1, the personalized voice function providing environment may provide a first-state voice function module 10s of an electronic device for receiving audio signals input by a plurality of speakers 10a to 10c in relation of a speaking independent setting. The first-state voice function module 10s may include, for example, at least one of a hardware module comprising hardware circuitry, a firmware module comprising firmware, or a software module related to provision of a voice function prior to application of a personalized voice function. At least one of the speakers 10a to 10c may input a voice (or speech information) using the first-state voice function module 10s.

According to various example embodiments of the present disclosure, the first-state voice function module 10s may perform a voice command function (e.g., a function of recognizing a collected voice, analyzing a voice command based on a result of recognition, and outputting information or performing an available function by an electronic device based on a result of analysis) based on a voice (or speech information) input by the speakers 10a to 10c. In relation to this operation, the speakers 10 to 10c may, for example, input a voice (or a speech or speech information) using at least one microphone included in the first-state voice function module 10s.

The first-state voice function module 10s may collect candidate data (including, for example, speaker speech information or speech information of each speaker) on the speakers 10a to 10c without performing speaker identification in a state in which a personalized voice function (e.g., a function of restricting use of functions of an electronic device differentially specified for each speaker) is not applied. A candidate data collecting operation may be automatically performed based on a specified condition. For example, the candidate data collecting operation may be automatically performed while a voice function is performed. Furthermore, the candidate data collecting operation may be automatically performed while a microphone activating operation is performed. According to various example embodiments of the present disclosure, the candidate data collecting operation may be performed for data obtained through successful voice recognition.

According to an example embodiment of the present disclosure, the first-state voice function module 10s may collect first candidate data 11a related to the first speaker 10a. Furthermore, the first-state voice function module 10s may collect second candidate data 11b related to the second speaker 10b and third candidate data 11c related to the third speaker 10c. The first-state voice function module 10s may perform voice function personalization processing (or voice recognition function personalization processing) if at least a specified number of candidate data are collected or collection of candidate data is completed for a specified time. For example, the first-state voice function module 10s may analyze a plurality of candidate data and may register, as personalized voice information, a speaker recognition model (including, for example, voice recognition information or voice recognition model information) including the first candidate data 11a related to the first speaker 10a. Accordingly, the first-state voice function module 10s may be operated as (or changed into) a second-state voice function module 10p. The first-state voice function module 10s may store collected candidate data locally (e.g., in a memory thereof). Alternatively, the first-state voice function module 10s may, for example, provide the collected candidate data to a specified server device. In the example where the collected candidate data are transmitted to the server device, recognition model training for candidate data may, for example, also be performed in the server device.

If the speech information of speakers is collected while a voice recognition function is performed, the second-state voice recognition module 10p may analyze the collected speech information and may compare an analysis result with the registered personalized voice information. If it is determined, as a result of the comparison, that the speech information corresponds to a speaker recognition model registered as the personalized voice information, the second-state voice function module 10p may handle execution of a function corresponding to the analysis result of the input speech information. If the result of the comparison indicates, for example, that the input speech information is speech information of the second speaker 10b or the third speaker 10c different from the speaker recognition model registered as the personalized voice information (e.g., the speech information of the first speaker 10a), the second-state voice function module 10p may not perform a function corresponding to the speech information or may perform a limited function based on a specified policy. When performing the limited function, the second-state voice function module 10p may output a function execution unavailability message or a limited function execution message. As described above, the personalized voice function providing environment according to various example embodiments of the present disclosure may handle execution of a function of an electronic device in a speaker-dependent manner (e.g., only a voice (or speech information) of a specific speaker is handled as valid information, or another speaker's voice (or speech information) is restrictively handled) based on registration of the personalized voice information.

Figure 2:
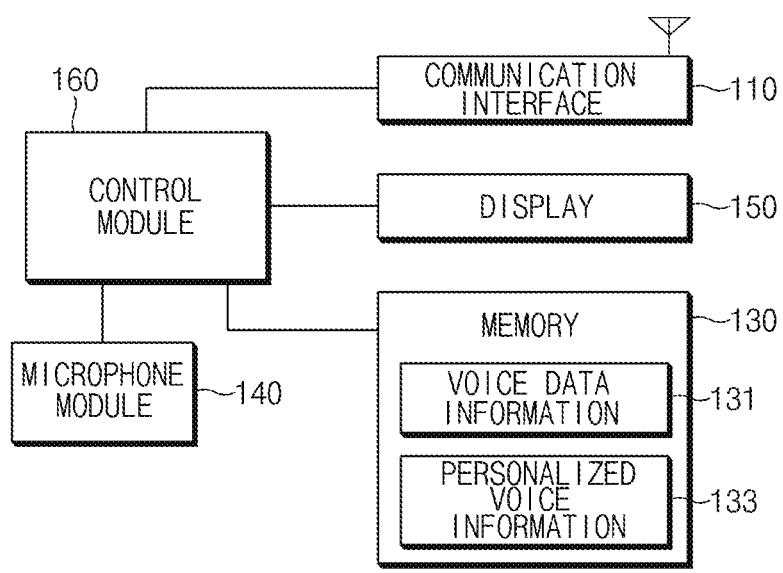
FIG. 2 is a block diagram illustrating an example of an electronic device supporting a voice function according to various example embodiments of the present disclosure.

FIG. 2 is a block diagram illustrating an example of an electronic device supporting a voice function according to various example embodiments of the present disclosure.

Referring to FIG. 2, an electronic device 100 may include, for example, a communication interface (e.g., including communication circuitry) 110, a memory 130, a microphone module (e.g., including a microphone or microphone circuitry) 140, a display (e.g., including a display panel and/or display processing circuitry) 150, and a control module (e.g., including a processor including processing circuitry) 160.

The electronic device 100 may collect candidate data using the microphone module 140 and may operate the control module 160, so as to process the candidate data, register personalized voice information (e.g., a specific speaker recognition model), and/or apply the personalized voice information. Based on this process, the electronic device 100 may handle a personalized voice function for supporting a speaker-dependent function.

The communication interface 110 may handle a communication function of the electronic device 100. For example, the communication interface 110 may establish a communication channel to a server device or the like in relation to a call function, a video call function, or the like of the electronic device 100. To this end, the communication interface 110 may include at least one communication module or communication chip/circuitry for supporting various communication standards such as 2G, 3G, 4G, LTE, 5G, etc. Furthermore, the communication interface 110 may include at least one antenna covering a single frequency band or a multi-frequency band. According to various example embodiments of the present disclosure, the communication interface 110 may establish a short-range communication channel to another electronic device in relation to a data transfer function or a call function of the electronic device 100.

According to an example embodiment of the present disclosure, the communication interface 110 may be operated in association with a voice function. For example, the communication interface 110 may establish a communication channel in relation to the voice function such as a call function or a voice-recognition-based message sending/receiving function. Furthermore, in relation to a voice command function, the communication interface 110 may establish a communication channel to a server device for analyzing a voice (or speech information) and providing information based on a result of analysis.

According to various example embodiments of the present disclosure, the communication interface 110 may be restrictively operated in relation to application of a personalized voice function. For example, the communication interface 110 may be enabled based on a speech information input corresponding to a speaker recognition model registered as personalized voice information. Alternatively, the communication interface 110 may establish a communication channel to a specified server device (e.g., a web server device for management of financial information, stock information, or specific information) in response to a speech information input from a specific recognized speaker.

The memory 130 may store various information related to operation of the electronic device 100. For example, the memory 130 may store an operating system required for operating the electronic device 100, at least one program related to support for a user function, etc. According to an example embodiment of the present disclosure, the memory 130 may store a personalized voice program to support a personalized voice function. Furthermore, the memory 130 may store voice data information 131 and personalized voice information 133 related to operation of the personalized voice program.

The voice data information 131 may include a voice signal (e.g., speech information) input from at least one speaker or an audio signal collected when the microphone module 140 is enabled. According to an example embodiment of the present disclosure, pieces of speech information from which a noise or a band other than a human voice band has been removed may be stored as candidate data of the voice data information 131. According to an example embodiment of the present disclosure, the voice data information 131 may include pieces of speech information, of which a speech interval has a length of at least a specified time, as a plurality of candidate data. Furthermore, the voice data information 131 may include a specified number of pieces of speech information as candidate data or may include pieces of speech information collected for a specified time as candidate data. A function of collecting the voice data information 131 may, for example, be automatically performed when the microphone module 140 is enabled in relation to execution of a voice function. Furthermore, this function may be automatically ended on completion of collecting the voice data information 131. According to various example embodiments of the present disclosure, the function of collecting the voice data information 131 may be automatically performed if specified voice recognition is successful, and may be automatically ended immediately after the collection is completed or after elapse of a specified time.

The personalized voice information 133 may be related to candidate data selected by applying a specified algorithm or process to the voice data information 131. For example, the personalized voice information 133 may be a speaker recognition model generated from candidate data related to a specific speaker (e.g., candidate data having a relatively large population in the voice data information 131) from among the plurality of candidate data included in the voice data information 131. Alternatively, the personalized voice information 133 may be candidate models obtained by modeling the candidate data related to the specific speaker. Alternatively, the personalized voice information 133 may be any one of the candidate data of the specific speaker, or information obtained by combining audio features detected from each candidate data, or a speaker recognition model including the audio features.

According to an example embodiment of the present disclosure, the personalized voice information 133 may include at least one phonemic model (e.g., a signal or information obtained by dividing speech information by phoneme such as h, ai, g, ae, l, ax, k, s, iy) constituting speech information (e.g., a signal or information obtained by speaking speech reference information such as, for example, 'high galaxy' by a specific speaker) obtained by speaking speech reference information (e.g., readable specified information such as characters or numbers, for example, 'high galaxy') by a specific speaker. Furthermore, even if a speaker speaks the same speech reference information, different phonemic models of various forms (e.g., phonemic signals or pieces of information with different pitches, tones, or timbres with respect to the same phonemic model such as 'ha') may be obtained with respect to the same reference phoneme (e.g., information obtained by dividing speech reference information by phoneme, for example, hi, ga, lax, sy, etc.), depending on a throat state of the speaker or an environment. For example, "h-a" or "h-ai" may be collected as a phonemic model corresponding to a reference phoneme "hi". Here, "h-a" or "h-ai" may be collected as different phonemic models with various pitches, tones, or timbres for each situation. As described above, the personalized voice information 133 may include at least one phonemic model included in speech information obtained by speaking specified speech reference information (e.g., at least one specified word, phrase, clause, sentence, etc.), so that, with respect to one reference phoneme, one or more phonemic models for each situation may be associated or one reference phoneme may be indicated.

The microphone module 140 may include at least one microphone. In the case where one microphone is disposed, the microphone module 140 may enable the microphone in response to control by the control module 160, and may transfer a collected audio signal to the control module 160 through the enabled microphone. Alternatively, the microphone module 140 may remain in a turned on state and may collect an audio signal while the electronic device 100 is supplied with power or the control module 160 is operated, in response to control by the control module 160. According to various example embodiments of the present disclosure, the microphone module 140 may include a plurality of microphones. The microphone module 140 may be automatically enabled, for example, when candidate data corresponding to the voice data information 131 are collected. For example, if the electronic device 100 is in a turned on state, the electronic device 100 may collect speech information corresponding to candidate data by automatically enabling the microphone module 140 for a specified time or until a specified number of candidate data is satisfied in order to collect candidate data. Alternatively, if the microphone module 140 is enabled (e.g., enabled as a voice function is performed), the electronic device 100 may determine whether it is required to collect candidate data so as to automatically collect speech information.

The display 150 may output various screens related to operation of the electronic device 100. For example, the display 150 may output a lock screen, a menu screen, a home screen, a screen on which at least one icon is disposed, a screen to which a background image is output, a specific function execution screen, or the like. According to an example embodiment of the present disclosure, the display 150 may output a screen related to execution of a voice function. For example, the display 150 may output a screen related to execution of a voice command function, a screen related to execution of a voice recording function, a screen related to execution of a voice call function, a screen related to execution of a voice recognition function, or the like in response to execution of a corresponding application.

Furthermore, the display 150 may output at least one information (e.g., a text, an image, or the like) related to operation of a personalized voice function. For example, the display 150 may output at least one of an icon, a menu, an indicator, or a guide text related to setting of the personalized voice function. Furthermore, the display 150 may output a message, a text, an indicator, or the like for notifying application of the personalized voice function. Moreover, the display 150 may output a personalized voice function setting screen in response to control by a user input. Additionally, or alternatively, the electronic device 100 may further include various information output units such as a speaker, a vibration module, a lamp, etc. The information output units may output various information related to operation of the personalized voice function using an audio, at least one specified vibration pattern, or at least one specified flickering pattern.

The control module 160 may be configured to perform signal flow control, signal processing control, and information processing in relation to operation of the electronic device 100. For example, the control module 160 may be configured to control setting of the personalized voice function (e.g., setting for collecting the voice data information 131 for registering the personalized voice information 133). The control module 160 may be configured to handle extraction and registration of the personalized voice information 133 on completion of collecting the voice data information 131. The control module 160 may be configured to handle application of the personalized voice function based on the registered personalized voice information 133. Based on the above-mentioned control, the control module 160 may be configured to allow a specified voice function to be applied in response to speech information input from a specific speaker or may limit a voice function (e.g., allow access to only a part of the function or prevent the function from being executed) in response to speech information input from a non-specific speaker.

Figure 3:
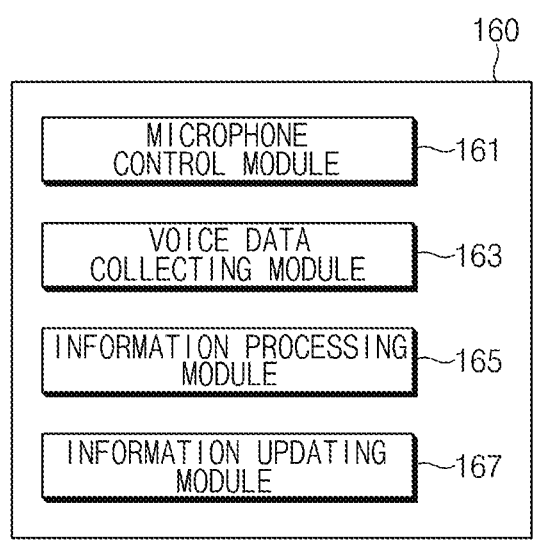
FIG. 3 is a block diagram illustrating an example of a control module according to various example embodiments of the present disclosure.

FIG. 3 is a block diagram illustrating an example of a control module according to various example embodiments of the present disclosure.

Referring to FIG. 3, the control module 160 may include a microphone control module 161, a voice data collecting module 163, an information processing module 165, and an information updating module 167. Each of the foregoing modules may, for example, be embodied by processor including processing circuitry configured to perform the operations of the various modules.

The microphone control module 161 may be configured to control enablement and audio signal collection of the microphone 140. For example, if the electronic device 100 is in a turned-on state, the microphone control module 161 may maintain a turned-on state (e.g., always turned-on state) of the microphone module 140 based on a setting. In the case where a plurality of microphones is included in the microphone module 140, the microphone control module 161 may control operation of the microphones.

According to an example embodiment of the present disclosure, if an audio signal is collected from the microphone module 140, the microphone control module 161 may transfer the collected audio signal to the voice data collecting module 163. In this operation, the microphone control module 161 may, for example, transfer the collected audio signal to the voice data collecting module 163 if the collected audio signal is a signal (or speech information) of a frequency band of a voice of a human being, or may treat (or ignore) the collected audio signal as a noise if, for example, the collected audio signal has a frequency outside the voice frequency band. Alternatively, the microphone control module 161 may transfer the collected audio signal to the voice data collecting module 163 regardless of a frequency band of the collected audio signal. According to various example embodiments of the present disclosure, the microphone control module 161 may transfer, to the voice data collecting module 163, only data from which a voice has been successfully recognized.

The microphone control module 161 may be configured to control collecting candidate data related to setting of the personalized voice function is automatically performed when the microphone module 140 is enabled. For example, if the microphone module 140 is enabled in order to execute a voice call function, a voice command function, a voice recognition function, a voice recording function, or the like, the microphone control module 161 may determine whether the personalized voice information 133 is registered. If the personalized voice information 133 is not registered, the microphone control module 161 may automatically collect pieces of speech information to be used as the voice data information 131 and may transfer the speech information to the voice data collecting module 163. If the personalized voice information 133 is registered, the microphone control module 161 may be configured to terminate collection of the speech information to be used as the voice data information 131 automatically.

In the example where the microphone control module 161 provides an audio signal regardless of a frequency band thereof, the voice data collecting module 163 may, for example, analyze whether the audio signal has been generated from a human speech. Furthermore, the voice data collecting module 163 may collect pieces of speech information corresponding to a voice frequency band as preliminary candidate group information. In the example where the microphone control module 161 is configured to transmit speech information, a speech information classifying operation of the voice data collecting module 163 may be skipped.

The voice data collecting module 163 may be configured to classify preliminary candidate data in the preliminary candidate group which satisfy a specified condition as candidate data of the voice data information 131. For example, the voice data collecting module 163 may classify only preliminary candidate data of which lengths (e.g., speech time) are at least a specified length as the candidate data of the voice data information 131. Furthermore, the voice data collecting module 163 may, for example, classify only preliminary candidate data related to specified speech reference information as the candidate data.

According to various example embodiments of the present disclosure, the voice data collecting module 163 may specify the number of candidate data or a time in relation to collection of the voice data information 131. For example, the voice data collecting module 163 may be configured to collect the voice data information 131 for a specified time after a specific event occurs (e.g., after the electronic device 100 is assigned specified personal information (e.g., a personal telephone number provided by a service provider) or after the electronic device 100 firstly accesses a specified base station). Alternatively, if the voice data collecting module 163 is turned on after being turned off for a specified time, the voice data collecting module 163 may be configured to collect the voice data information 131 for a specified time. Alternatively, the voice data collecting module 163 may be configured to collect the voice data information 131 until a specified number of candidate data are collected after setting of the personalized voice function is started. The number of candidate data may be changed based on a setting of a personalized voice function policy or may be changed by user's setting. The voice data collecting module 163 may provide, to the information processing module 165, the voice data information 131 including the specified number of candidate data or candidate data collected for a specified time.

The information processing module 165 may be configured to select the personalized voice information 133 from the voice data information 131. For example, the information processing module 165 may select arbitrary candidate data from the voice data information 131 and may perform voice feature (e.g., a unique voice feature of each speaker, such as a timbre) comparison between the selected candidate data and another candidate data. The information processing module 165 may classify (e.g., by clustering) candidate data by performing the feature comparison. For example, an unsupervised learning method such as vector quantization may be used. The information processing module 165 may select candidate data, the number of which is relatively large, from among classified candidate data. The arbitrary candidate data may be selected from among, for example, initially collected candidate data, lastly collected candidate data, and candidate data collected in a specified certain time slot.

The information processing module 165 may be configured to register selected candidate data as the personalized voice information 133. In this operation, the information processing module 165 may provide a guide on whether to register the personalized voice information 133, and may, for example, request user approval. For example, the information processing module 165 may provide a popup window providing a query on whether to register specified candidate data as the personalized voice information 133, and may handle registration of the personalized voice information 133 based on a user confirmation. The information processing module 165 may be configured to output time information about collection times of the candidate data or voice recognition information of the candidate data output together with the candidate data in order to differentiate the candidate data.

When a specified voice function such as a voice command function is performed, the information processing module 165 may be configured to perform speaker identification based on collected speech information and the registered personalized voice information 133. The information processing module 165 may be configured to differentiate a function to be performed based on a result of speaker identification. For example, in the case where speech information of a speaker registered in the personalized voice information 133 is collected, the information processing module 165 may perform a function to be performed in response to speech information recognition. Alternatively, in the case where speech information of a speaker not registered in the personalized voice information 133 is collected, the information processing module 165 may notify that information output or function execution corresponding to speech information is unable to be performed.

The information processing module 165 may be configured to perform multi-condition training while performing modeling based on data included in the voice data information 131. In relation to this operation, the information processing module 165 may handle various effects for the data included in the voice data information 131. For example, the information processing module 165 may provide a specified sound effect to the data included in the voice data information 131 and may generate candidate data based on the sound effect, or may generate candidate data with which a specified noise is combined. The information processing module 165 may extract a speaker model to be registered as the personalized voice information 133, by applying multi-condition-trained candidate data (e.g., data to which a specified sound effect is added or data to which a noise is added) together with data included in other voice data information 131. According to various example embodiments of the present disclosure, the information processing module 165 may generate multi-condition training models in relation to candidate data included in a cluster having a relatively large number of candidate data after, for example, clustering candidate data included in the voice data information 131. Furthermore, the information processing module 165 may be configured so that multi-condition training models generated based on candidate data included, for example, in a cluster of a specific speaker are used for determining a speaker recognition model.

The information processing module 165 may use a universal background model (UBM) during a speaker modeling process for candidate data included in the voice data information 131. UBM information may include a statistical model generated based on features of speech information of various persons. The UBM information may be generated based on non-speaker data during a process of calculating a speaker recognition model of a speaker specified in the voice data information 131. The non-speaker data may, for example, be differentiated from speaker data based on the above-mentioned clustering method.

The information updating module 167 may be configured to handle modification, adaptation or enhancement of the personalized voice information 133. In relation to this operation, the information updating module 167 may request and receive, from the microphone control module 161, an audio signal collected by the microphone module 140, and may extract information to which the personalized voice information 133 is to be adapted. For example, the information updating module 167 may check whether the collected audio signal includes user's speech information (including at least one of a wakeup audio signal related to a voice function or a voice command audio signal). In the example where the speech information is included in the collected audio signal, the information updating module 167 may check whether phonemes corresponding to phonemic models included in the specified personalized voice information are included in the collected speech information. In this operation, the information updating module 167 may collect new phonemic samples corresponding to the phonemic models included in the personalized voice information 133 by performing voice recognition on the collected speech information, and may perform phonemic model training based on the collected phonemic samples. Furthermore, the information updating module 167 may perform enhancement (or adaption or the like) of the phonemic models of the personalized voice information 133 according to the phonemic model training.

The information updating module 167 may check an adaptation ratio (or an adaptation degree or an enhancement ratio) of the personalized voice information 133 adapted using the collected speech information. For example, the information updating module 167 may determine whether a frequency of information update of the personalized voice information 133 by newly collected speech information is equal to or higher than a specified value. If the newly collected speech information is already obtained speech information, additional update may not occur. The information updating module 167 may determine that the adaptation ratio is high if the update frequency is high (e.g., the number of pieces of speech information used for update from among a certain number of collected pieces of speech information is at least a specified value), or may determine that the adaptation ratio is low if the update frequency is low and may terminate adaptation of the personalized voice information 133.

The information updating module 167 may automatically collect speech information when the microphone module 140 is enabled in relation to adaptation of the personalized voice information 133. If a function of adapting the personalized voice information 133 is ended (e.g., the adaptation ratio is equal to or lower than a specified condition), the information updating module 167 may automatically end collection of speech information related to adaptation of the personalized voice information 133. The information updating module 167 may be configured so that specified information is output through the display 150 in relation to starting or automatic ending of adaptation-related speech information collection.

Figure 4:
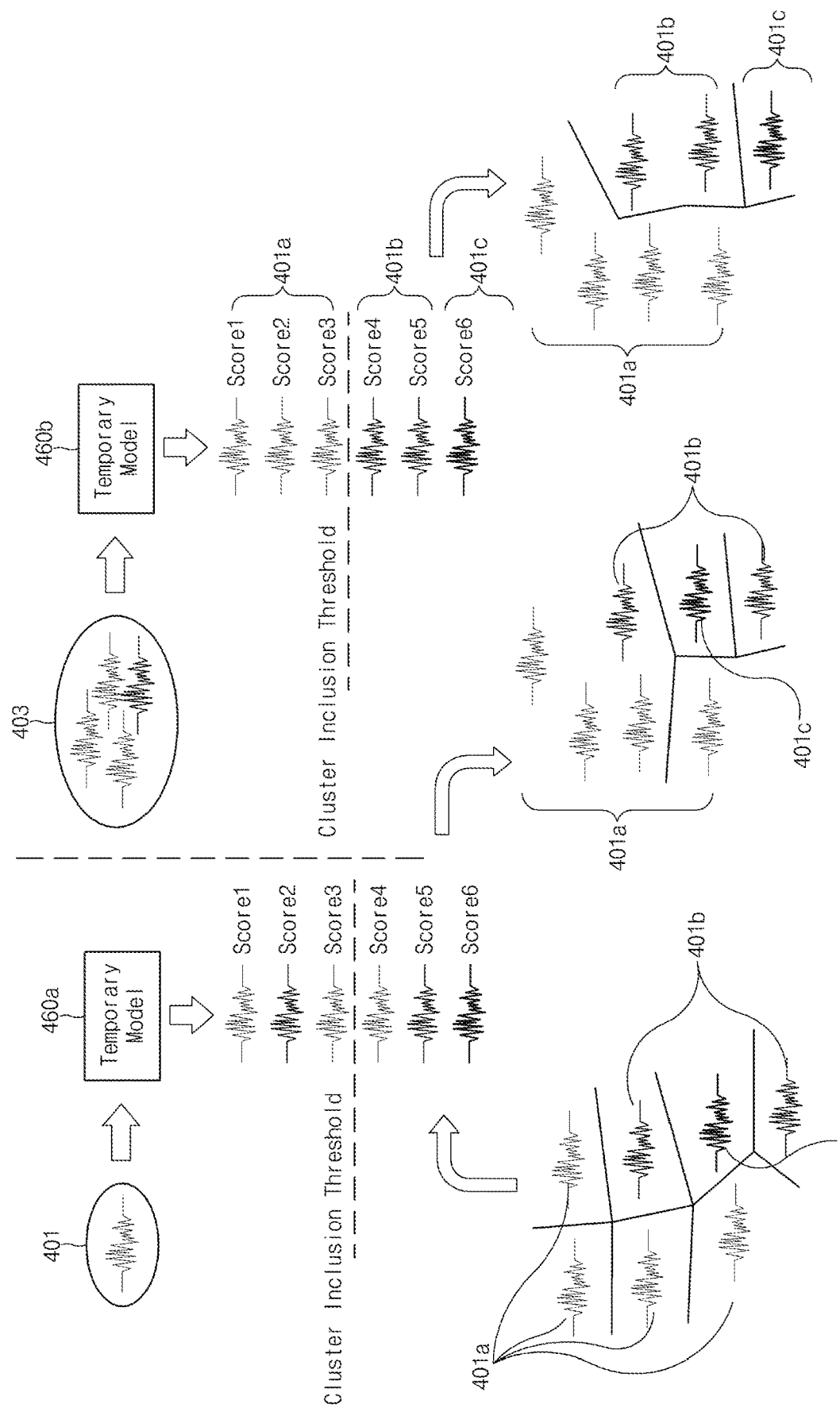
FIG. 4 is a diagram illustrating an example candidate group handling method related to speaker-dependent setting according to various example embodiments of the present disclosure.

FIG. 4 is a diagram illustrating an example candidate group handling method related to speaker-dependent setting according to various example embodiments of the present disclosure.

Referring to FIG. 4, the electronic device 100 may collect a specified number of pieces of the voice data information 131 or may collect the voice data information 131 for a specified time. The collected voice data information 131 may include, for example, pieces of speech information 401a to 401c corresponding to candidate data spoken by three speakers. If collection of the pieces of speech information 401a to 401c is completed, the electronic device 100 may classify the pieces of speech information 401a to 401c.

In relation to this operation, the electronic device 100 may select any one arbitrary piece of speech information 401 from among the collected pieces of speech information 401a to 401c based on a specified condition. If the arbitrary speech information 401 is selected, the electronic device 100 may convert the arbitrary speech information 401 into a first temporary model 460a. If the first temporary model 460a is generated, the electronic device 100 may compare the first temporary model 460a with the pieces of speech information 401a to 401c, and may assign a score to each of the pieces of speech information 401a to 401c. For example, the electronic device 100 may assign a low score to speech information similar to the first temporary model 460a, and may assign a high score to speech information having no similarity with the first temporary model 460a. The electronic device 100 may sort the pieces of speech information 401a to 401c in order of score.

Furthermore, the electronic device 100 may cluster the pieces of speech information 401a to 401c in order of score as illustrated in the center of FIG. 4. As illustrated in FIG. 4, three data from among pieces of the first speech information 401a spoken by a first speaker and one piece of data from among pieces of the second speech information 401b spoken by a second speaker may be clustered as one group. Furthermore, one piece of the first speech information 401a spoken by the first speaker, the second speech information 401b, and the third speech information 401c may be clustered as separate groups respectively.

The electronic device 100 may detect a second temporary model 460b using pieces of information 403 clustered with pieces of speech information having low scores. Furthermore, the electronic device 100 may compare the pieces of speech information 401a to 401c with the second temporary model 460b generated based on the clustered pieces of information 403. Accordingly, as illustrated in FIG. 4, the first speech information 401a obtains lowest scores (or scores equal to or higher than a specified threshold), and the second speech information 401b and the third speech information 401c obtain relatively high scores (or scores equal to or lower than the specified threshold). The electronic device 100 may re-perform clustering based on the scores, thereby obtaining a cluster including pieces of the first speech information 401a, a cluster including pieces of the second speech information 401b, and a cluster including the third speech information 401c, as illustrated in FIG. 4. Based on the above result, the electronic device 100 may register the cluster including the pieces of the first speech information 401a as the personalized voice information 133.

Figure 5:
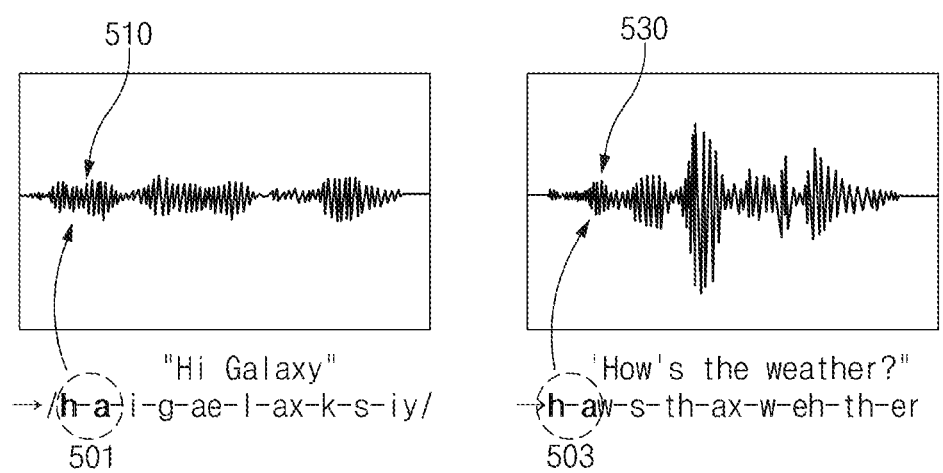
FIG. 5 is a diagram illustrating an example personalized voice information update according to various example embodiments of the present disclosure.

FIG. 5 is a diagram illustrating an example personalized voice information update according to various example embodiments of the present disclosure.

Referring to FIG. 5, the personalized voice information 133 of a specific speaker may be audio information corresponding to speech reference information "Hi Galaxy". In this example, as described above, the personalized voice information 133 may include phonemic models for each of "h-ai-g-ae-l-ax-k-s-iy" as illustrated in FIG. 5. According to an example embodiment of the present disclosure, the personalized voice information 133 may include, for example, a "ha" registration phonemic model 501, as a phonemic model. Furthermore, the personalized voice information 133 may include a registration frequency model 510 related to the corresponding registration phonemic model 501 when the speaker speaks "Hi Galaxy".

The electronic device 100 may enable the microphone module 140 based on a specified condition. As illustrated in FIG. 5, the microphone 140 may collect audio information obtained by speaking speech reference information such as "How's the weather?" by a specific speaker. In this example, the electronic device 100 may extract phonemic models "h-aw-s-th-ax-w-eh-th-er" for the speech reference information. The electronic device 100 may collect a new phonemic model 503 of the same "ha" from among the extracted phonemic models. Furthermore, the electronic device 100 may collect a new frequency model 530 corresponding to the new phonemic model 503.

In response to the same phonemic model "ha", the electronic device 100 may store the new phonemic model 503 and the new frequency model 530 in association with the registration phonemic model 501 and the registration frequency model 510, or may integrate and store the foregoing models and frequencies as one phonemic model group. As described above, the electronic device 100 may extract a phonemic model and a frequency model from speech information spoken by a specific speaker so as to extend a model group of the registered personalized voice information 133. Based on this extended model group, the electronic device 100 may more accurately recognize specified speech reference information registered as the personalized voice information 133 even if a speaker speaks the speech reference information in various situations.

As described above, according to various example embodiments of the present disclosure, an electronic device according to an example embodiment of the present disclosure may include a memory for storing at least a portion of a plurality of pieces of speech information used for voice recognition, and a control module for generating voice recognition information based on at least a portion of the plurality of pieces of speech information, wherein the control module may select speaker speech information from at least a portion of the plurality of pieces of speech information based on mutual similarity, and may generate the voice recognition information to be registered as personalized voice information based on the speaker speech information.

According to various example embodiments of the present disclosure, the control module may be configured so that a message for applying the voice recognition information to the voice recognition is output.

According to various example embodiments of the present disclosure, the control module may be configured so that the pieces of speech information are collected for a specified time or until a specified number of the pieces of speech information is satisfied.

According to various example embodiments of the present disclosure, the control module may be configured to generate multi-condition training models of the plurality of pieces of speech information, and may use the multi-condition training models to determine the voice recognition information to be registered as the personalized voice information.

According to various example embodiments of the present disclosure, the control module may be configured to generate multi-condition training models of pieces of the speaker speech information, and may use the multi-condition training models to determine the voice recognition information to be registered as the personalized voice information.

According to various example embodiments of the present disclosure, the control module may be configured so that other speech information input from a specific speaker corresponding to the personalized voice information is collected and a model of the personalized voice information is adapted.

According to various example embodiments of the present disclosure, the control module may be configured so that a phonemic sample corresponding to a registered phonemic model included in the personalized voice information is extracted from the speech information input from the specific speaker and is used to adapt the registered phonemic model.

According to various example embodiments of the present disclosure, in the example where new speech information newly input is not a speech of the specific speaker corresponding to the personalized voice information, the control module may be configured so that a message of unavailability of function execution based on the new speech information is output or may selectively control the function execution based on the type of a function requested by the new speech information.

According to various example embodiments of the present disclosure, the control module may be configured so that the function is not performed if the function is a specified secure function or the function is performed if the function is a non-secure function not specified.

According to various example embodiments of the present disclosure, the control module may be configured so that a setting screen is output for setting at least one function item to be executed based on a voice function in response to a speech information input from a speaker specified based on the personalized voice information.

As described above, according to various example embodiments of the present disclosure, an electronic device according to an example embodiment of the present disclosure may include a memory for storing voice data information including pieces of speech information as candidate data, and a control module configured so that one piece of speaker-related information is selected from the candidate data, wherein the control module may be configured so that the candidate data are clustered based on mutual similarity, and specified personalized voice information is registered to be used to restrict execution of a function based on whether specified speech information is input, based on candidate data with the same similarity, the number of which is relatively large.

Figure 6:
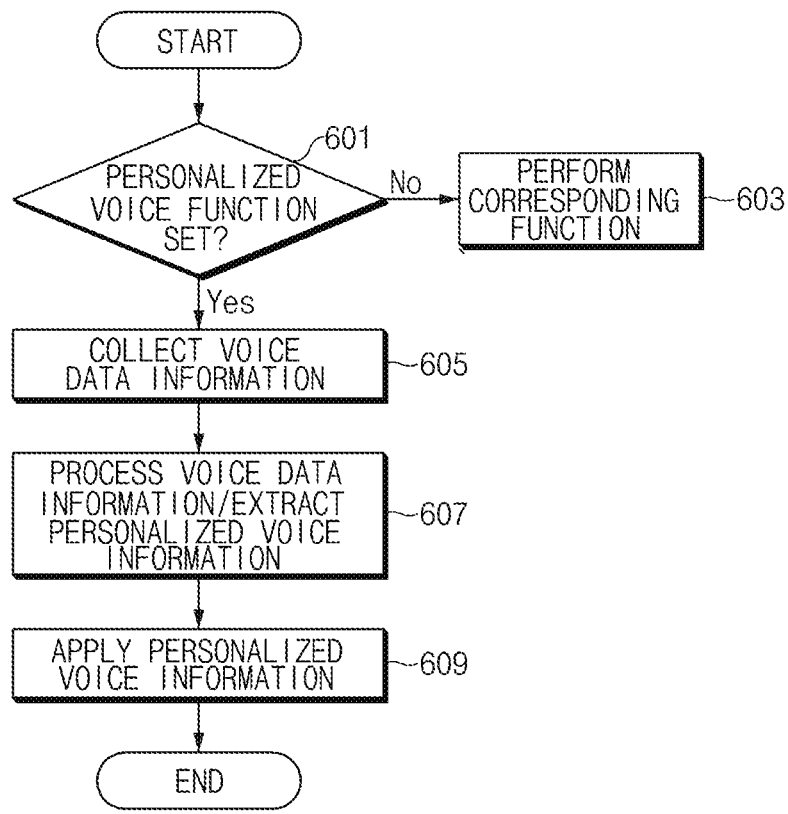
FIG. 6 is a flowchart illustrating an example method of personalized voice during operation of a voice function according to various example embodiments of the present disclosure.

FIG. 6 is a flowchart illustrating an example method of personalized voice during operation of a voice function according to various example embodiments of the present disclosure.

Referring to FIG. 6, in operation 601, if an event occurs, the control module 160 of the electronic device 100 may be configured to determine whether the event is related to setting of a personalized voice function. For example, the control module 160 may be configured to determine whether the event is for executing a specified function for personalized voice, or is related to automatic execution of a personalized voice function, or is for executing specified function such as a voice recognition function.

If the event is not related to setting of the personalized voice function, the control module 160 may be configured to control execution of a function based on the type of the event that has occurred in operation 603. For example, the control module 160 may check the type of the event, and may handle playback of a music file, transfer of a specified file, execution of a call function, or execution of a web access function based on the type of the event.

If the event is related to setting of the personalized voice function, the control module 160 may collect candidate data as the voice data information 131 in operation 605. In relation to this operation, the control module 160 may enable the microphone 140 if the electronic device 100 is in a turned-on state or at a specified time. The control module 160 may collect a specified number of candidate data at a specified period, or in real time, or when an audio signal having a specified intensity or higher occurs. According to an example embodiment of the present disclosure, the control module 160 may be configured to perform a candidate group collecting operation until the number of candidate data becomes a specified number. According to an example embodiment of the present disclosure, the control module 160 may be configured to automatically enable the microphone module 140 for a specified time (e.g., one hour, one day, one week, one month, or the like) after the electronic device 100 is purchased, so as to collect candidate data. Alternatively, the control module 160 may be configured to collect candidate data until specified number of candidate data are collected or for a specified time, when a voice function (e.g., a call function, a voice recognition function, a recording function, a voice command function, or the like) is operated.

In operation 607, the control module 160 may be configured to process the voice data information 131 and may extract the personalized voice information 133. For example, the control module 160 may be configured to extract clusters including candidate data spoken by the same speaker by performing comparison between collected pieces of the voice data information 131 with a temporary model and performing clustering of the collected pieces of the voice data information 131. The control module 160 may be configured to compare data of the extracted clusters so as to extract candidate data of a cluster having a largest number of data and register the extracted candidate data as the personalized voice information 133.

In operation 609, the control module 160 may be configured to handle application of personalized voice information. If the personalized voice information 133 is registered, the control module 160 may be configured to compare speaker speech information input thereafter with data of the personalized voice information 133 to check similarity therebetween. Furthermore, if the similarity satisfies a specified condition (e.g., a similarity degree is equal to or higher than a specified value), the control module 160 may recognize the input speech information as speech information of a specific speaker. If it is determined that the input speech information is the speech information of the specific speaker, the control module 160 may be configured to control a voice function for the speech information. For example, the control module 160 may perform voice recognition on the speech information, and may control execution of a specified function based on a voice recognition result. Alternatively, the control module 160 may support at least one of retrieval and output of internal information of the electronic device 100 with respect to the voice recognition result or retrieval and output of information using an external server device in relation to the voice recognition result.

If the input speech information is not the speech information of the specific speaker, the control module 160 may be configured to output a guide text for notifying that a speaker of the input speech information is not the specific speaker, or may support execution of a specified function according to a user's setting or a set policy. For example, the control module 160 may perform retrieval and output of information related to the result of voice recognition from the speech information using an external server device. Alternatively, in the case where the speaker of the input speech information is not the specific speaker, the control module 160 may be configured to check the type of information or the type of a function to be performed by the speech information based on the user's setting or policy, and may restrictively or selectively perform function execution or information output.

Figure 7:
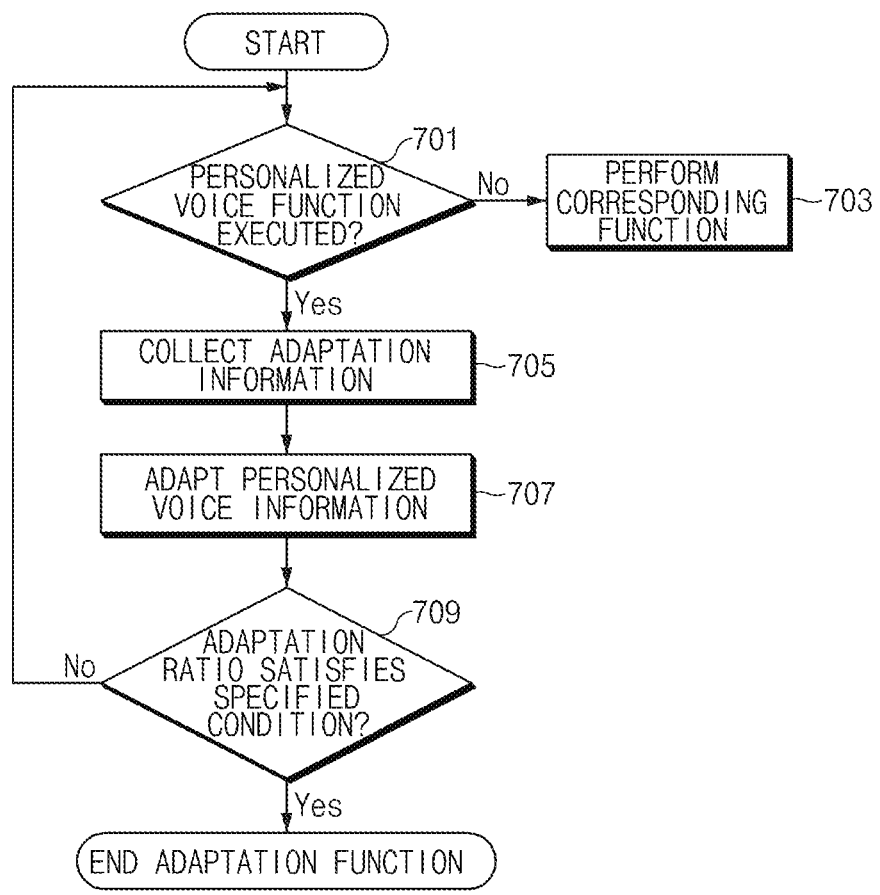
FIG. 7 is a flowchart illustrating an example personalized voice information update method according to various example embodiments of the present disclosure.

FIG. 7 is a flowchart illustrating an example personalized voice information update method according to various example embodiments of the present disclosure.

Referring to FIG. 7, in operation 701, the control module 160 may be configured to determine whether a personalized voice function is currently executed or an event that has occurred is related to execution of the personalized voice function. If the personalized voice function is not currently executed or there is no occurrence of the related event, the control module 160 may support execution of a specified function or control of a specified state in operation 703. For example, the control module 160 may support a camera function or a music playback function according to the type of the event. Alternatively, the control module 160 may maintain a sleep mode.

If there is a setting (e.g., a setting for automatically supporting an always-on state) related to execution of the personalized voice information or an event (e.g., an event of requesting enablement of the microphone module 140 in relation to execution of the personalized voice function) occurs, the control module 160 may be configured to collect adaptation (or enhancement) information in operation 705. For example, the control module 160 may be configured to enable the microphone module 140 and may collect speech information having a specified length or longer or speech information corresponding to specified speech reference information.

In operation 707, the control module 160 may be configured to perform personalized voice information adaptation. According to an example embodiment of the present disclosure, the control module 160 may be configured to collect phonemic models from various information spoken by a specific speaker, and may store or integrate the collected models in association with phonemic models having the same reference phonemes as those of phonemic models registered as the personalized voice information 133. Alternatively, the control module 160 may be configured to collect only speech information corresponding to the specified speech reference information, and may manage phonemic models corresponding to the same reference phonemes in the collected speech information by integrating the phonemic models into one model group.

In operation 709, the control module 160 may determine whether an adaption ratio (or an adaptation degree or an enhancement ratio) satisfies a specified condition. For example, the control module 160 may be configured to check the degree of similarity between the phonemic models in the collected speech information and phonemic models being managed and an information update ratio based on the degree of similarity, and may specify the adaptation ratio based on the update ratio or update frequency. If the adaptation ratio does not satisfy the specified condition, the process may return to operation 701 so that the control module 160 may re-perform operation 701 and the following operations. If the adaptation ratio satisfies the specified condition, the control module 160 may end a personalized voice information adaptation function.

Figure 8:
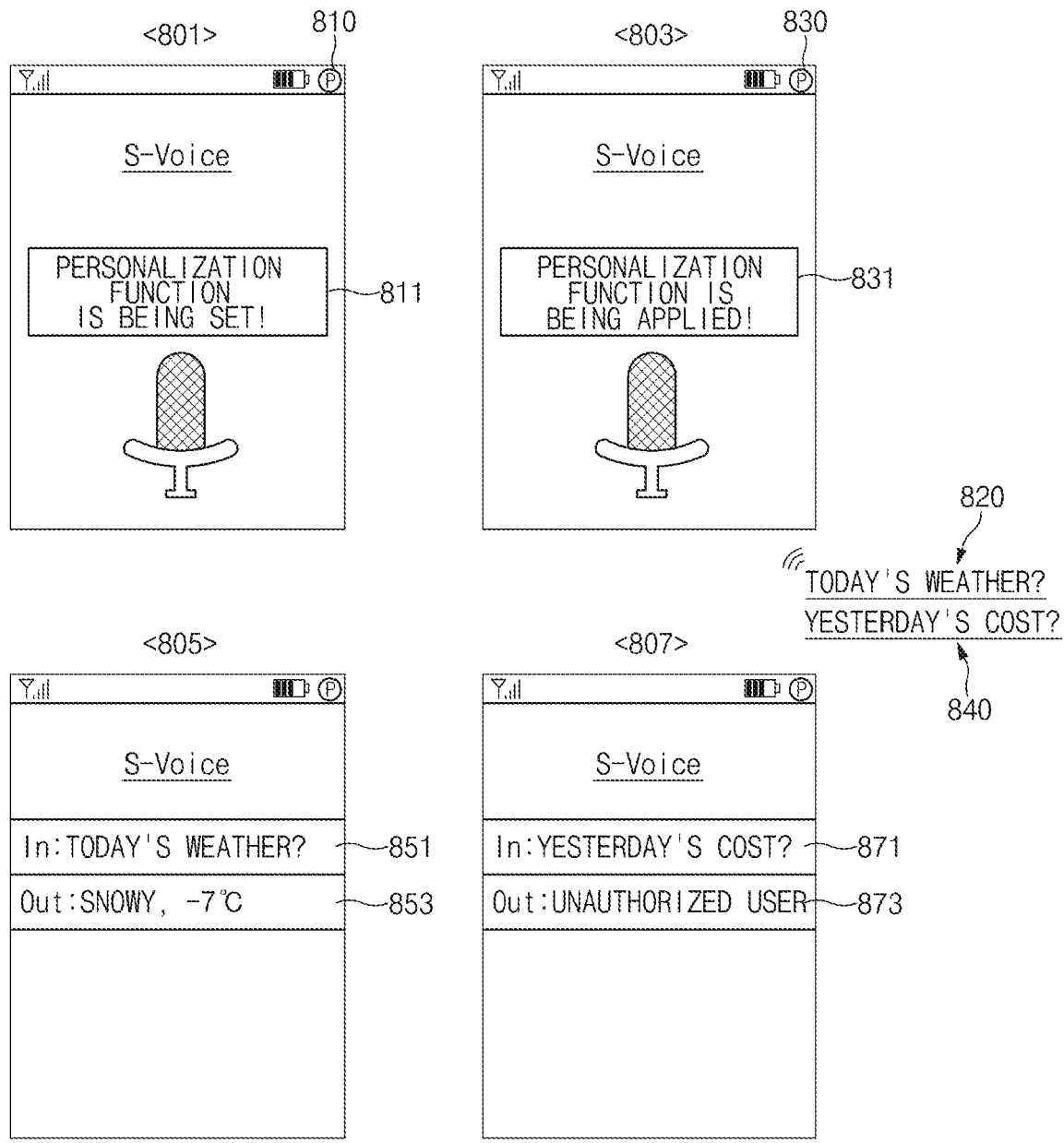
FIG. 8 is a diagram illustrating an example of a screen interface related to execution of a personalized voice function according to various example embodiments of the present disclosure.

FIG. 8 is a diagram illustrating an example of a screen interface related to execution of a personalized voice function according to various example embodiments of the present disclosure.

Referring to FIG. 8, the control module 160 of the electronic device 100 may be configured to output, to the display 150, a screen corresponding to activation of a voice function (e.g., a voice command function) as illustrated in a screen 801. In this operation, if a personalization function is not currently applied, the control module 160 may output a guide message 811 for providing a notification that the personalization function is being set. The guide message 811 may include at least one of a text or an image for notifying that candidate group information is being collected in relation to setting of the personalized voice function. Output of the guide message 811 may be skipped based on a setting or a user input. Alternatively, as illustrated in FIG. 8, the control module 160 may output, to a specified area (e.g., an indicator area), a first indicator 810 for notifying that the personalization function is being set.

If a specific audio signal is input while the personalization function is being set, the control module 160 may be configured to determine whether a collected audio signal is speech information corresponding to a voice by checking a frequency band of the audio signal. If the audio signal is the speech information, the control module 160 may collect it as the voice data information 131. Alternatively, even if the audio signal is the speech information, the control module 160 may determine whether a specified condition (e.g., speech information having at least a certain length or speech information corresponding to specified speech reference information) is satisfied. The control module 160 may be configured to collect pieces of the speech information satisfying the specified condition as the voice data information 131. According to various example embodiments of the present disclosure, the control module 160 may collect an audio signal as the voice data information 131 or may collect an audio signal of which a signal existence state is maintained for at least a certain length as the voice data information 131. Furthermore, if the voice data information 131 is collected by as much as a specified amount or for a specified time, the control module 160 may evaluate the collected voice data information 131 with respect to division of speech information or correspondence to speech reference information.

If the personalized voice information 133 is registered since collecting and processing of the voice data information 131 for executing a personalized voice function are completed, the control module 160 may output a guide message 831 for notifying that the personalization function is being applied, as illustrated in a screen 803. The guide message 831 may include at least one of a text or an image indicating that the personalized voice function is being applied. Output of the guide message 831 may be skipped based on a setting or a user control input. Alternatively, the control module 160 may output, to a specified area (e.g., an indicator area), a second indicator 830 for notifying that the personalized voice function is being applied.

The control module 160 may be configured to perform training for voice modeling, after sufficient voice samples are obtained for a specified time or a specified number or a specified amount of sufficient voice samples are obtained. If, for example, it is determined that a sufficient speaker recognition performance is obtained since a training result brings about a specified amount (e.g., equal to or larger than a specified sample number or specified reliability), the control module 160 may provide, to a user, a recommendation or selection message for inducing the user to use a personalized voice recognition function. In this operation, the control module 160 may request user's approval (e.g., confirmation according to a popup message output) for updating a model.

If an audio signal is input while the personalization function is applied, the control module 160 may analyze the input audio signal. Based on a result of audio signal analysis, the control module 160 may support function execution or restrictive function execution. For example, if a first voice command 820 is collected, the control module 160 may analyze the first voice command 820 and may classify it as a request for non-secure function execution. According to an example embodiment of the present disclosure, in the case where the analyzed first voice command 820 includes a non-specified word (e.g., weather, news, bus information, etc.), the control module 160 may classify the first voice command 820 as a request for non-secure function execution. Alternatively, in the case where the first voice command 820 does not include a specified word (e.g., cost, card, mail, message, call history, etc.), the control module 160 may classify the first voice command 820 as a request for secure function execution. Alternatively, the control module 160 may determine whether the type of an application to be executed by the first voice command 820 is a secure function or a non-secure function. In relation to this operation, the electronic device 100 may include classification information on a secure function or a non-secure function for each application type.

If the first voice command 820 for a non-secure function or a function not specified by a user as a speaker-dependent function is collected, the control module 160 may collect and output information for the first voice command 820. For example, as illustrated in a screen 805, the control module 160 may output first voice recognition information 851 corresponding to the first voice command 820, and may output first execution information 853 as a result of performing a function or retrieval corresponding to the first voice recognition information 851.

If a second voice command 840 is collected while the personalized voice function is applied, the control module 160 may perform speaker analysis (e.g., comparison with the personalized voice information 133) on the second voice command 840, and may process the second voice command 840 only if analyzed speaker information indicates a registered speaker. For example, if it is determined that a speaker indicated as a result of analysis is not a registered speaker, the control module 160 may output a message related to unavailability of processing the second voice command 840.

According to various example embodiments of the present disclosure, the control module 160 may evaluate the collected second voice command 840, and may determine whether the second voice command 840 is related to a secure function or a function specified as a speaker-dependent function. If the second voice command 840 is related to a non-secure function or a function not specified as a speaker-dependent function, the control module 160 may handle execution of a function based on the second voice command 840 without additionally checking the personalized voice information 133. Alternatively, if the second voice command 840 is related to a secure function or a speaker-dependent function, the control module 160 may identify a speaker of the second voice command 840 using the personalized voice information 133. Furthermore, if it is determined that the speaker of the second voice command 840 is a specific speaker, the control module 160 may execute a function corresponding to the second voice command 840. If the second voice command 840 is not speech information input from a specific speaker, the control module 160 may output, in response to the second voice command 840, a restrictive message 873 of user identification or unavailability of function execution. For example, the control module 160 may selectively output second voice recognition information 871 for the second voice command 840.

Figure 9:
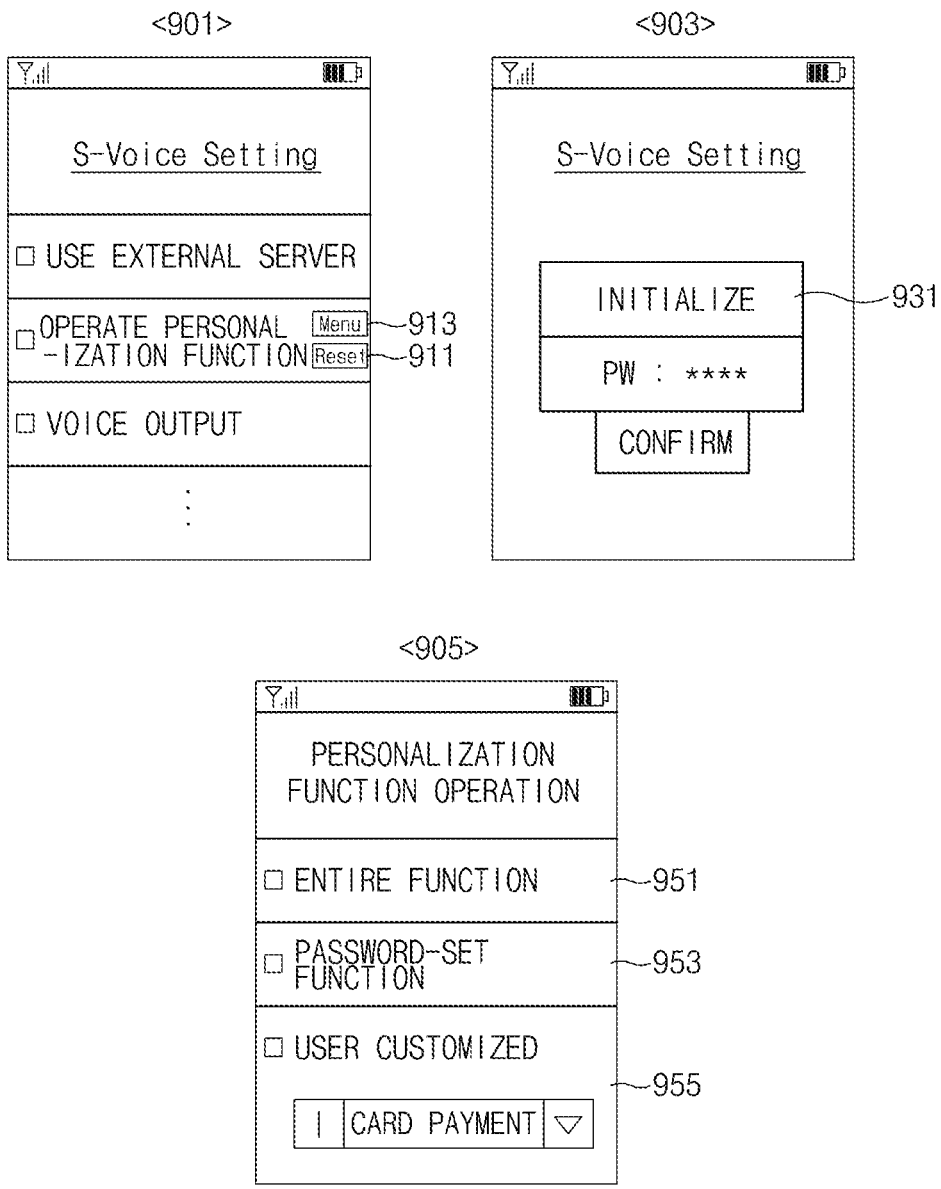
FIG. 9 is a diagram illustrating an example of a screen interface related to setting of personalized voice information according to various example embodiments of the present disclosure.

FIG. 9 is a diagram illustrating an example of a screen interface related to setting of personalized voice information according to various example embodiments of the present disclosure.

Referring to FIG. 9, if an event related to voice function setting occurs, the control module 160 of the electronic device 100 may output, to the display 150, a setting screen as illustrated in a screen 901. The setting screen may include items related to voice function setting, such as an external server use item, a personalization function operation item, and a voice output item. As illustrated in FIG. 9, a virtual reset button 911 may be assigned to the personalization function operation item in relation to personalization function setting or application.

If the virtual reset button 911 is selected, the control module 160 may support resetting of the voice data information 131 or the personalized voice information 133 obtained in relation to personalization function setting or application. In relation to this operation, the control module 160 may output, to the display 150, a popup window 931 related to initialization as illustrated in a screen 903. The popup window 931 may include, for example, a message for providing a guide on initialization and an authentication information input area for user authentication.

In screen 901, if a menu item 913 is selected in relation to personalization function operation, the control module 160 may output a menu screen related to personalization function operation as illustrated in a screen 905. The menu screen may include, for example, items for selecting at least one application to which a personalized voice function is to be applied. For example, the menu screen may include an entire function item 951, a password-set function item 953, and a user customized item 955.

The entire function item 951 may be a restrictive item for allowing only a specific speaker to use, through a voice function, all functions supported by applications installed in the electronic device 100. In the case where the entire function item 951 is not set, the electronic device 100 may operate a voice function based on speech information of various users without specifying a speaker.

The password-set function item 953 may be a restrictive item for allowing function items related to a secure function to be used based on a voice function and speech information of a specific speaker. According to an example embodiment of the present disclosure, when the password-set function item 953 is selected, the electronic device 100 may provide items of functions that require password authentication when operated according to user designation or items of functions that require password authentication for an application operating schedule among provided applications. A specific function may be excluded from the password-set function item 953 when a password set in an application is released.

The user customized item 955 may enable a user to specify an application item to be used based on a voice function and speech information of a specific speaker. If the user customized item 955 is selected, the electronic device 100 may output a list of applications supported by the electronic device 100. Here, the electronic device 100 may automatically remove the password-set function item 953 from a list related to the user customized item 955 to display the list.

As described above, according to various example embodiments of the present disclosure, a voice function operating method according to an example embodiment of the present disclosure may include storing at least a portion of a plurality of pieces of speech information used for voice recognition, selecting speaker speech information from at least a portion of the plurality of pieces of speech information based on mutual similarity, and generating voice recognition information to be registered as personalized voice information based on the speaker speech information selected.

According to various example embodiments of the present disclosure, the method further comprises at least one of collecting the speech information for a specified time or collecting the speech information until a specified number of candidate data is satisfied.

According to various example embodiments of the present disclosure, the method may further include outputting a message for applying the voice recognition information to the voice recognition.

According to various example embodiments of the present disclosure, the method may further include generating multi-condition training models of the plurality of pieces of speech information, and applying the multi-condition training models to determine the voice recognition information to be registered as the personalized voice information.

According to various example embodiments of the present disclosure, the generating may include generating multi-condition training models of pieces of the speaker speech information, and applying the multi-condition training models to determine the voice recognition information to be registered as the personalized voice information.

According to various example embodiments of the present disclosure, the method may further include collecting other speech information input from a specific speaker corresponding to the personalized voice information, and adapting a model of the personalized voice information using the other speech information of the specific speaker.

According to various example embodiments of the present disclosure, the adapting may include extracting a phonemic sample corresponding to a registered phonemic model included in the personalized voice information from the speech information input from the specific speaker to use the phonemic sample in adapting the registered phonemic model.

According to various example embodiments of the present disclosure, the method may further include outputting, if new speech information newly input is not a speech of the specific speaker corresponding to the personalized voice information, a message of unavailability of execution of a function according to the new speech information, and selectively executing the function according to the type of the function requested by the new speech information.

According to various example embodiments of the present disclosure, the executing the function may include not performing the function if the function is a specified secure function and performing the function if the function is a non-secure function and is not specified.

According to various example embodiments of the present disclosure, the method may further include outputting a setting screen for setting at least one function item to be executed based on a voice function in response to a speech information input from a speaker specified based on the personalized voice information.

As described above, according to various example embodiments of the present disclosure, a voice function operating method according to an example embodiment of the present disclosure may include collecting pieces of speech information as candidate data, clustering the candidate data based on mutual similarity, and registering specified personalized voice information to be used to restrict execution of a function based on whether specified speech information is input, based on candidate data with the same similarity, the number of which is relatively large.

Figure 10:
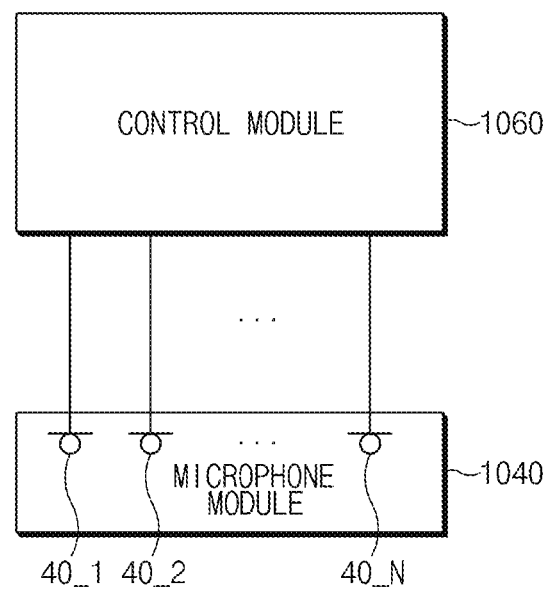
FIG. 10 is a block diagram illustrating an example of an electronic device according to various example embodiments of the present disclosure.

FIG. 10 is a block diagram illustrating an example of an electronic device according to various example embodiments of the present disclosure.

Referring to FIG. 10, the electronic device 100 may include a control module (e.g., including a processor including processing circuitry) 1060 and a microphone module (e.g., including at least one microphone) 1040.

The microphone module 1040 may include, for example, first to Nth microphones 40_1 to 40_N. The first to Nth microphones 40_1 to 40_N may be connected to, for example, the control module 1060. The first to Nth microphones 40_1 to 40_N may be arranged at one side of the electronic device 100 so as to be spaced apart from each other by a certain distance.

The microphone module 1060 may control at least one of the microphones included in the microphone module 1040. For example, at a time of setting a personalized voice function, the control module 1060 may enable the first microphone 40_1 and may analyze an audio signal collected by the first microphone 40_1. Furthermore, the control module 1060 may use audio signals collected through the first microphone 40_1 as the voice data information 131. The control module 1060 may also collect pieces of speech information corresponding to the voice data information 131 using the first to Nth microphones 40_1 to 40_N. Alternatively, the control module 1060 may use the first microphone 40_1 alone to collect the voice data information 131, and may use the first to Nth microphones 40_1 to 40_N to adapt (or enhance) the personalized voice information 133.

In the example where the microphone module 1040 is required to be maintained in a turned-on state as an always-on function is executed, the electronic device 100 may enable the first microphone 40_1 and may check whether speech information corresponding to specified speech reference information (e.g., "hi galaxy") is collected. The electronic device 100 may use, for adapting the personalized voice information 133, additional speech information collected in a state in which the other microphones are enabled after the speech information corresponding to the speech reference information is collected. In this operation, the electronic device 100 may support execution of a voice function according to the speech information collected by the microphones 40_1 to 40_N.

In a state in which a personalized voice function is not applied, the control module 1060 may support a voice function using the first microphone 40_1 alone. Furthermore, in a state in which the personalized voice function is applied, the control module 1060 may detect speech information corresponding to the speech reference information using the first microphone 40_1, and may collect additional speech information using the microphones 40_1 to 40_N.

Alternatively, in the state in which the personalized voice function is not applied, the control module 1060 may collect speech information and may perform analysis on whether the collected speech information corresponds to the speech reference information using the first microphone 40_1 alone. In the state in which the personalized voice function is applied, the control module 1060 may detect speech information corresponding to the speech reference information using a plurality of microphones (e.g., the first and second microphones 40_1 and 40_2). Furthermore, in the state in which the personalized voice function is applied, the control module 1060 may enable the first to Nth microphones 40_1 to 40_N to control collection of additional speech information, if speech information corresponding to the speech reference information is collected.

As described above, the electronic device 100 may control operation of the microphones 40_1 to 40_N in consideration of efficient use of power or in order to collect more clear speech information.

Figure 11:
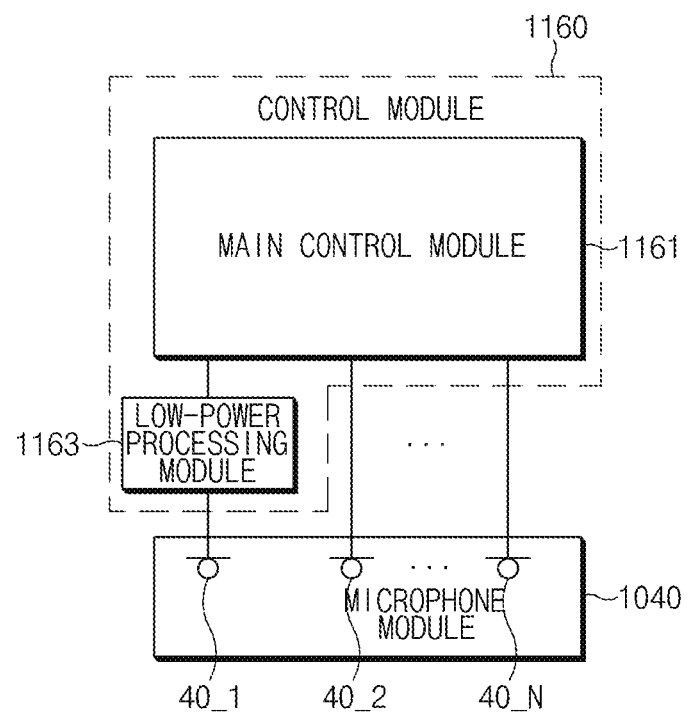
FIG. 11 is a block diagram illustrating another example of an electronic device according to various example embodiments of the present disclosure.

FIG. 11 is a block diagram illustrating another example of an electronic device according to various example embodiments of the present disclosure.

Referring to FIG. 11, the electronic device 100 may include a control module (e.g., including a processor including processing circuitry) 1160 and a microphone module (e.g., including at least one microphone) 1040.

The microphone module 1040 may include first to Nth microphones 40_1 to 40_N in a similar manner to that described above with reference to FIG. 10. The plurality of microphones 40_1 to 40_N may be connected to the control module 1160. For example, the first microphone 40_1 from among the plurality of microphones 40_1 to 40_N may be connected to a low-power processing module 1163. The Nth microphone 40_1 from among the plurality of microphones 40_1 to 40_N may be connected to a main control module 1161. Meanwhile, the second to Nth microphones 40_2 to 40_N may be connected to both the low-power processing module 1163 and the main control module 1161. Furthermore, the first microphone 40_1 may be connected to not only the low-power processing module 1163 but also the main control module 1161. Accordingly, the first microphone 40_1 may transfer a collected audio signal to the low-power processing module 1163, or, if the main control module 1161 is in a woken state, the first microphone 40_1 may transfer the collected audio signal to the main control module 1161 or both the low-power processing module 1163 and the main control module 1161.

The control module 1160 may include the main control module 1161 and the low-power processing module 1163.

The low-power processing module 1163 may, for example, be a processor (e.g., including processing circuitry) driven with relatively low power compared to the main control module 1161. For example, the low-power processing module 1163 may be a chip dedicated to audio signal processing, a sensor hub, or a chip dedicated to speech information processing. The low-power processing module 1163 may be independently driven while the main control module 1161 is in a sleep mode, so as to control driving of the first microphone 40_1 included in the microphone module 1040 and analyze an audio signal collected by the first microphone 40_1. For example, the low-power processing module 1163 may analyze whether the audio signal collected by the first microphone 40_1 is speech information corresponding to a voice, or is speech information corresponding to specified speech reference information, or is speech information spoken by a specific speaker. If the speech information satisfies a specified condition, the low-power processing module 1163 may wake the main control module 1161. In this operation, the low-power processing module 1163 may perform control so that the second to Nth microphones 40_2 to 40_N which are in a disabled state is enabled.

In operation of a voice function, the main control module 1161 may be woken by the low-power processing module 1163 after remaining in a sleep mode in consideration of efficient use of power. In this example, the main control module 1161 may enable the second to Nth microphones 40_2 to 40_N, and may collect and analyze additional speech information. The main control module 1161 may control collection of the voice data information 131 for collected pieces of speech information, registration of the personalized voice information 133, and restrictive execution of a voice function according to application of a personalized voice function, as described above with respect to the control module 150.

The term "module" used herein may represent, for example, a unit including one of hardware (including hardware circuitry), software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of processing circuitry, hardware circuitry, firmware, an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various example embodiments of the present disclosure may be implemented as instructions stored in a computer-readable storage medium in the form of a program module.

The module or program module according to various example embodiments of the present disclosure may include at least one of the above-mentioned elements, or some elements may be omitted or other additional elements may be added. Operations performed by the module, the program module or other elements according to various example embodiments of the present disclosure may be performed in a sequential, parallel, iterative or heuristic way. Furthermore, some operations may be performed in another order or may be omitted, or other operations may be added.

According to various example embodiments of the present disclosure, the type of voice function that may be operated for each speaker or the type of an application executable by voice recognition may be handled in a speaker-dependent manner.

Therefore, according to various example embodiments of the disclosure, the security related to a voice function of an electronic device may be secured.

The above example embodiments of the present disclosure are illustrative and not limitative. Various alternatives and equivalents are possible. Other additions, subtractions, or modifications will be apparent in view of the present disclosure and are intended to fall within the scope of the appended claims.

What is claimed is:

1. An electronic device comprising:
   a microphone configured to receive voice command; and
   at least one processor including processing circuitry, the at least one processor functionally connected to a memory, wherein the at least one processor is configured to:
   receive a first voice command through the microphone of the electronic device,
   provide the first voice command to a server device to recognize the first voice command,
   receive a response corresponding to the first voice command from the server,
   execute a function according to the response from the server, and
   store a speaker dependent voice recognition model for the first voice command in a memory of the electronic device, wherein the speaker dependent voice recognition model is generated by the server device based on clustering pieces of speech information based on score according to similarity between the speaker dependent voice recognition model and a temporary model related to the first voice command and whether audio data corresponding to the first voice command for a given speaker is collected above a predetermined threshold,
   wherein the one or more processor is further configured to:
   receive a second voice command newly inputted through the microphone of the electronic device,
   recognize the second voice command using the voice recognition model stored in the memory, and
   execute the function in response to the recognizing the second voice command using the voice recognition model.

2. The electronic device of claim 1, wherein the processor is configured to output a message providing a notification that an operation of applying the voice recognition model to a voice recognition is being performed.

3. The electronic device of claim 1, wherein, when the second voice command newly input is not the first voice command, the processor is configured to output a message of unavailability of execution of the function requested by the second voice command.

4. The electronic device of claim 3, wherein, the processor is configured to provide the second voice command to the server device.

5. The electronic device of claim 1, wherein the processor is configured to output a setting screen for setting at least one function item to be executed based on a voice function in response to the second voice command.

6. A voice function operating method in an electronic device including a microphone configured to received audio data, and at least one processor functionally connected to a memory, the method comprising:
- receiving a first voice command through the microphone of the electronic device, providing the first voice command to a server device to recognize the first voice command,
- providing the first voice command to a server device to recognize the first voice command,
- receiving a response corresponding to the first voice command from the server,
- executing a function according to the response from the server, and
- storing a speaker dependent voice recognition model for the first voice command in a memory of the electronic device, wherein the speaker dependent voice recognition model is generated by the server device based on clustering pieces of speech information based on score according to similarity between the speaker dependent voice recognition model and a temporary model related to the first voice command and whether audio data corresponding to the first voice command for a given speaker is collected above a predetermined threshold, wherein the method further comprises:
- receiving a second voice command newly inputted through the microphone of the electronic device,
- recognizing the second voice command using the voice recognition model stored in the memory, and
- executing a function in response to the recognizing the second voice command using the voice recognition model.

* * * * *